United States Patent [19]

Degen et al.

[11] Patent Number: 5,799,280

[45] Date of Patent: Aug. 25, 1998

[54] RECORDING METHOD AND APPARATUS AND AUDIO DATA USER INTERFACE

[75] Inventors: Leo Degen, Menlo Park; S. Joy Mountford, Mountain View; Richard Mander, Palo Alto; Gitta B. Salomon, Menlo Park, all of Calif.

[73] Assignee: Apple Computer, Inc., Cupertino, Calif.

[21] Appl. No.: 850,646

[22] Filed: May 2, 1997

Related U.S. Application Data

[63] Continuation of Ser. No. 477,779, Jun. 7, 1995, abandoned, which is a continuation of Ser. No. 951,579, Sep. 25, 1992, Pat. No. 5,586,216.

[51] Int. Cl.$^6$ ........................................................ G10L 9/00
[52] U.S. Cl. ........................ 704/276; 704/275; 360/13
[58] Field of Search .............................. 395/285; 360/13

[56] References Cited

U.S. PATENT DOCUMENTS

| | | | |
|---|---|---|---|
| 3,634,759 | 1/1972 | Koshikawa et al. | 395/2.85 |
| 4,310,838 | 1/1982 | Juso et al. | 340/703 |
| 4,868,687 | 9/1989 | Penn et al. | |
| 4,924,303 | 5/1990 | Brandon et al. | 358/86 |
| 5,065,345 | 11/1991 | Knowles et al. | 395/154 |
| 5,220,611 | 6/1993 | Nakamura et al. | |
| 5,299,118 | 3/1994 | Martens et al. | 364/413.05 |
| 5,375,199 | 12/1994 | Harrow et al. | 395/339 |
| 5,600,373 | 2/1997 | Chui et al. | 348/397 |

FOREIGN PATENT DOCUMENTS 0402911 12/1990 European Pat. Off.

OTHER PUBLICATIONS

Morishima et al. "A media Conversion from speech to facial image for intelligent man–machine interface", IEEE Journal on selected topics in Communications, vol.9, No.4, May 1991.

Koch et al., "Intelligent user interface for expert systems applied to poer plant maintenance and troubleshooting", IEEE Transactions on Energy Conversion, vol.3, No. 1, Mar. 1988.

Tufte, "Envisioning Information", chapter 5—Color and Information, pp. 80–95, Graphics Press, Jan. 1990.

Chalfonte, B., Fish, R., and R. Kraut. "Expressive Richness: A Comparison of Speech and Text as Media for REvision" *Association for Computing Machinery*, pp. 21-26, 1991.

(List continued on next page.)

*Primary Examiner*—David R. Hudspeth
*Assistant Examiner*—Vijay B. Chawan
*Attorney, Agent, or Firm*—Blakely, Sokoloff, Taylor & Zafman

[57] ABSTRACT

A method and apparatus for marking audio data as it is recorded, and a user interface for the audio data in a computerized system, is disclosed. A recorder, such as a tape recorder, having a plurality of marker buttons is provided. The audio data is recorded on one channel of a magnetic tape. Any time one of the marker buttons is pressed, a distinct tone is recorded on another channel of the tape as a marker. The audio data and markers are then transferred to the computer system. The user interface provides a graphical display of the audio data, and provides graphical markers which correspond to the marker buttons on the recorder. The audio data can be accessed at any random point, including a point marked by a marker. Without changing modes, a user can access the data at any random point, stop play, select a new point to initiate playback and restart playback, and change the speed of playback. Additional functions, such as editing, zooming the display and changing the form of the graphical display, are also provided.

6 Claims, 11 Drawing Sheets

OTHER PUBLICATIONS

Phillips, R. "A General Multimedia Digital Publication System" *Communications of the ACM* vol. 34, No. 7, pp. 75–83, Jul. 1991.

Proceedings of the Internationl Conference on Cybernetics and Society, "The Intelligent Ear: A Graphical Interface to Digital Audio" Schmandt, C. *IEEE Systems, Man and Cybernetics SWociety*, Atlanta, GA, pp. 393–397, Oct. 1981.

Schmandt, C., M.I.T. Media Laboratory and B. Arons, Olivetti Research Center. "Desktop Audio" (Getting the Word in the Oct. 1989 issue of Unix Review, vol. 7, No. 10, pp. 54–62.

Schmandt, C. and B. Arons. "Phone Slave: A Graphical Telecommunications Interface" *Society for Information Display 1984 International Symposium Digest of Technical Papers* pp. 1–4, Jun. 1984.

RECORDING METHOD AND APPARATUS AND AUDIO DATA USER INTERFACE

This is a continuation of application Ser. No. 08/477,779, filed Jun. 7, 1995, now abandoned, which is a continuation of application Ser. No. 07/951,579, filed Sep. 25, 1992, now U.S. Pat. No. 5,586,216.

BACKGROUND OF THE INVENTION

1. Field of the Invention

The present invention relates to the field of recorded audio data in computer systems and more particularly to a recorder having means to apply markers to the recorded audio data and to user interfaces for use in display, playback and manipulation of audio data.

2. Prior Art

Audio data, including various forms of voice data, is widely used for communication of information, as well as for storage of information for later retrieval and use. For example, the familiar microcassette recorder or dictaphone is frequently used to store a user's idea or other information for later use. The audio data may be a letter to be typed, which is stored by speaking the data into a microphone on the recorder, or the audio data may be the conversation among participants of a meeting which is similarly recorded for later review. Despite the widespread use of audio data in situations such as those outlined above, such data is used only rarely on personal computers. This is true despite the facts that audio data, for example, a recorded voice, is otherwise familiar to and well understood by the user, is often the most convenient means for capturing the data, and contains information such as affect and gender, which is not present in other forms of data.

Several problems exist with audio data which makes its use cumbersome. First, the serial nature of the data does not allow for random access. Thus, for example, if a user is near the beginning of the data (i.e., at the beginning of a tape) and desires to move to a point near the end of the data, the user will have to fast forward to the desired point, which can take several minutes. Another problem is the limited ability to identify and therefore locate portions of the data. Many existing tape recorders have a tape counter mechanism. However, it may not be convenient or possible for a user to write down the counter numbers at the desired locations as the data is being recorded. Additionally, even if the user is able to note separately counter numbers at certain locations, it may difficult for the user to know the relevance of the audio data at the noted locations. This inability to locate certain pieces of data, is further compounded by the serial nature of the data described above. A user may need to sample several points in a data to find the desired data, and therefore must take the time necessary to go backward and forward on the tape to access the sampled locations.

Additionally, the serial nature of the audio data makes it difficult to organize the data. For example, a user may dictate a letter, then record a "to do" memo in order to remind him or herself that a certain task must be performed in the future, and then record an idea for a new product. Although these three items are entirely unrelated, they will reside on the tape in close proximity to one another with, as described above, no easy way of determining where each item is located.

Another problem in the use of audio data is the lack of correspondence between interfaces from the recording hardware domain to the computer domain. For example, a user familiar with a microcassette recorder or dictaphone will be comfortable with the recorder's interface elements, such as the play, rewind, cue and review, and counter zeroing mechanism. However, prior art computer audio interfaces for performing functions such as locating or playing back the audio data may bear no relation to the recording hardware interface. Thus, the user will be unable to understand intuitively the computer interface and may thus feel "lost" when reviewing the data in the computer domain. Additionally, prior art audio data user interfaces are cumbersome to use. After the data has been displayed in the prior art, the user must access a different mode to indicate the desired starting point of playback, to initiate or stop playback, etc.

What is needed is a method and apparatus which allows users to mark audio data while the data is being recorded. The method and apparatus should have sufficient flexibility to allow the user to assign the meaning and organization of the markings. The markings should enable the user to identify quickly pertinent portions of the data. What is further needed is a method and apparatus for interacting with the audio data in the computer domain. The computer interface should correspond to the hardware interface used to record the audio data. The computer interface should allow a user to identify quickly and to access randomly the audio data. Finally, the computer interface should allow for fluid control of the audio data by providing for several frequently used functions to be performed in a single mode.

SUMMARY OF THE INVENTION

In a preferred embodiment of the present invention, a method and apparatus for marking audio data as it is being recorded, is provided. The meaning and organization of the markers is determined by the user. The present invention also provides a user interface for use in visually displaying the recorded audio data. The interface of the present invention provides visual markers which correspond to the recorder markers used to mark the data. The audio data can be accessed beginning at a marked portion, or at any random point. Further, several functions, such as selection of the portion of the data to be accessed, initiation and stopping of playback, and speed of playback can be controlled in a single mode. In alternative embodiments, other functions, including changing the scale of the displayed data, can be controlled in the same mode as other functions.

Additional features and advantages of the present invention will be obvious from the detailed description which follows.

BRIEF DESCRIPTION OF THE DRAWINGS

The present invention is illustrated by way of example, and not by way of limitation, in the accompanying drawings in which.

This application makes reference to co-pending U.S. patent application Ser. No. 07/951,239, now U.S. Pat. No.

5,386,493, entitled "Apparatus and Method for Playing Back Audio at Faster or Slower Rates Without Pitch Distortion," invented by Leo MWF Degen and Martijn Zwartjes, filed concurrently, which application is assigned to the assignee of the present application and which application is incorporated herein by reference.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

DETAILED DESCRIPTION OF THE PREFERRED EMBODIMENT

Apparatuses and methods for recording, displaying, and playing back audio data will now be described in detail. In the following description, specific steps, procedures, commands, and other specifics are set forth in order to provide a thorough understanding of the present invention. However, it will be apparent to one skilled in the art that the present invention may be practiced without these specific details. In other instances, well known systems and methods are not shown in detail in order not to obscure in unnecessary detail the present invention.

Figure 1:
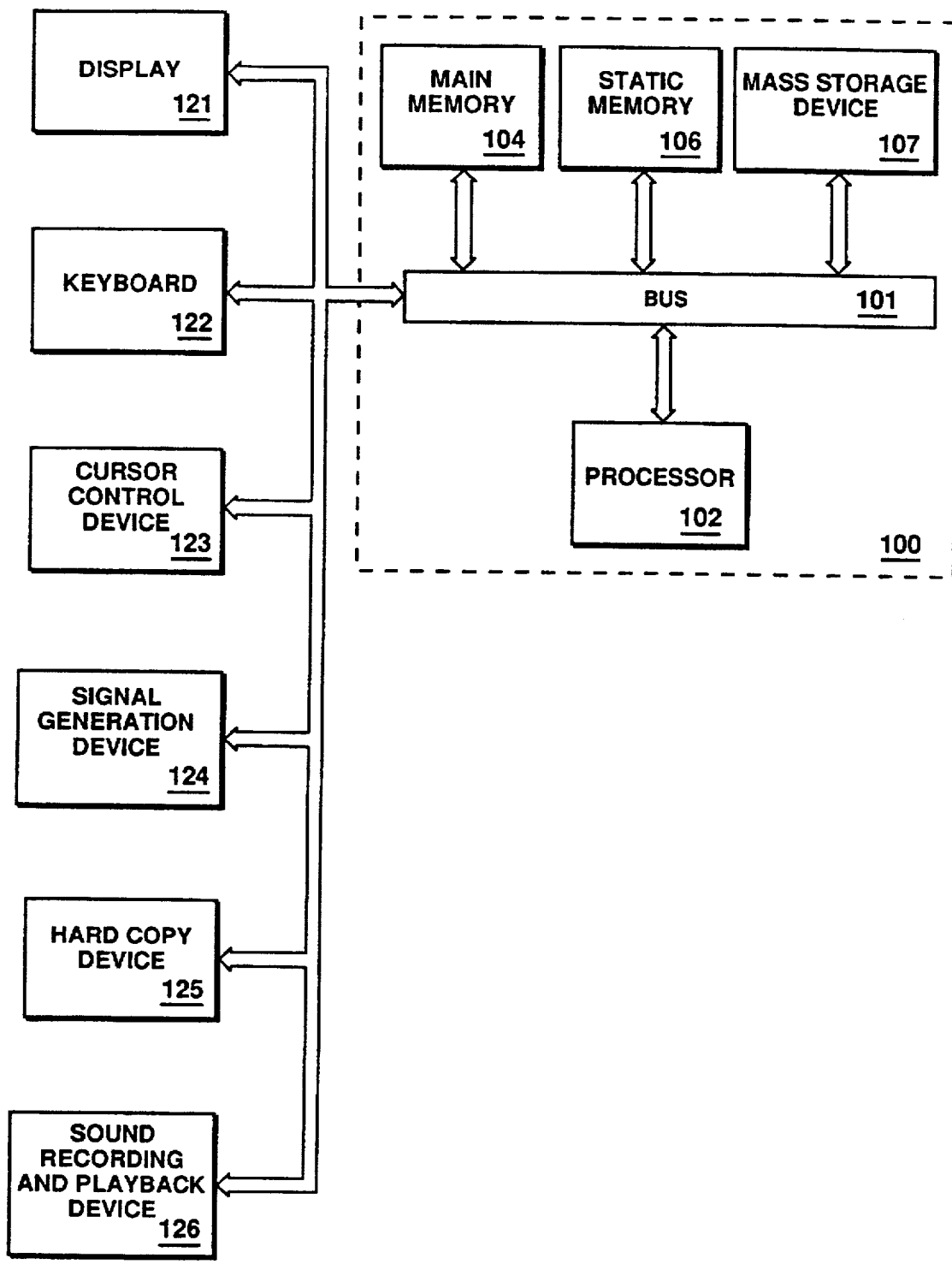
FIG. 1 is a block diagram of a computer system upon which the user interface of the present invention may be implemented.

FIG. 1 shows an example of a computer system 100 upon which the audio data user interface of the present invention may be implemented. Computer system 100 includes processor 102, such as a microprocessor, main memory 104, such as system RAM, static memory 106, such as read only memory (ROM), and mass storage device 107, such as a hard disk or other storage means having a high capacity for storing digitized audio data and other information maintained by the system 100. The processor 102, the main memory 104, the static memory 106, and the mass storage device 107 (which has its own I/O controller) are interconnected by a system bus 101 which includes control signals as well address lines and data lines for sharing information, including data and instructions, between the components of the computer system 100. Also connected to the system bus 101 are various peripherals as shown in FIG. 1. As will be understood by one skilled in the art, the peripherals attached to system 100 are attached through a plurality of I/O controllers. Each of the peripheral devices may have its own I/O controller, or two or more devices may be controlled by a single I/O controller. The I/O controllers are not shown in FIG. 1 for convenience. As shown in FIG. 1, display 121, keyboard 122, cursor control device 123, signal generation device 124, hard copy device 125, and sound recording and playback device 126 are coupled to computer system 100. Device 126 includes an audio digitizer means coupled to a microphone for recording information, and a speaker coupled to a digital to analog (D/A) converter for playing back the digitized sounds. The display 121 displays on its display screen a cursor which is controlled by the cursor control device 123 of FIG. 1. The display 121 may be any one of a variety of known display systems, such as a video (CRT) display monitor or a liquid crystal display, for example.

The cursor control device 123 of the present invention may be, for example, a mouse in a preferred embodiment. For convenience, cursor control device 123 will be referred to as mouse 123 herein. However, it will understood by those in the art that many other types of cursor control means may be utilized such as graphic tablets, touch tablets, track balls, pen input mechanisms, touch screens, joy sticks, etc. Indeed, any device capable of indicating X–Y locations and capable of controlling a cursor on the display 121 of computer system 100 may be utilized in the present invention as a cursor control device 123. The signal generation device 124, which typically includes a switch connected to a button, is frequently included in the housing of mouse 123. A user presses the button to send one signal to the computer system 100 and releases the button to send another signal to the computer system 100. Other signal generation means, as is well known in the art, may be used such as using certain keys on keyboard 122 or using a pen input device which both positions a cursor, and by pressing the pen's tip against the display screen, selects the item pointed to/pressed at on the display screen 121.

In a currently preferred embodiment, computer system 100 is one of the Macintosh® family of personal computers manufactured by Apple® Computer, Inc. of Cupertino, Calif. (Apple and Macintosh are registered trademarks of Apple Computer, Inc.). Processor 102 is one of the 68000 families of microprocessors such as the 68000, 68020 or 68030 manufactured by Motorola, Inc. of Schraumberg. As will readily be appreciated by one skilled in the art, different devices or components from those shown in FIG. 1 may be used in the practice of the present invention as described below. Additionally, some of the devices, such as keyboard 122, for example, need not be employed in some embodiments.

Figure 2:
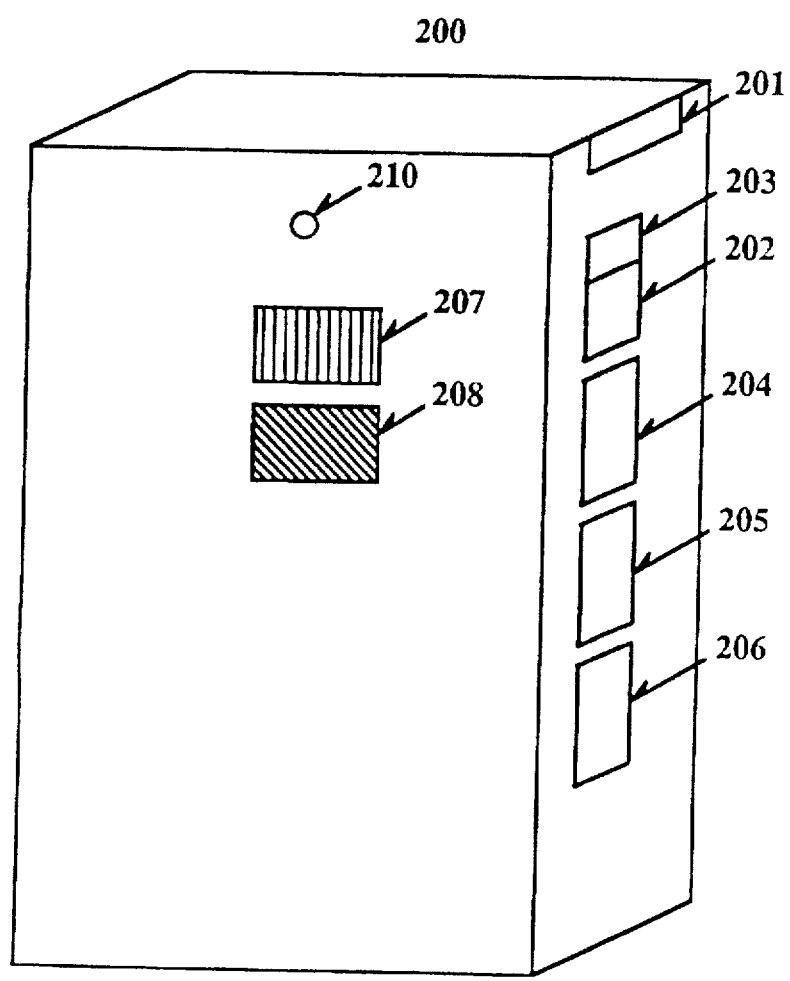
FIG. 2 shows a preferred embodiment of the recording means of the present invention.

FIG. 2 shows a currently preferred embodiment of recording device 200 of the present invention. Recording device 200 comprises microphone 201, play button 202, record button 203, stop/eject button 204, rewind button 205 and fast forward button 206. In order to record through microphone 201, both record button 203 and play button 202 must be pressed simultaneously in a currently preferred embodiment. Recorder 200 also comprises a tape holding mechanism, record and play heads, capstans and other features necessary to play and record audio data on magnetic tape, not shown in FIG. 2. The above described functions and features of recorder 200 are similar to those of familiar hand-held microcassette recorders or dictaphones. Recorder 200 is capable of recording on at least two channels in a currently preferred embodiment, as will be described below. A recorder 200 which can record in stereo may be used in the practice of the present invention. Recorder 200 typically has dimensions in the range of approximately 3"–6" high, 2"–4" wide, and 1"–2" deep in a currently preferred embodiment.

Also shown in FIG. 2 is recording marker buttons 207 and 208. In a currently preferred embodiment, marker button 207 is red and marker button 208 is green. In the embodiment shown in FIG. 2, recorder 200 comprises two marker buttons 207 and 208. However, it will readily be appreciated that recorder 200 could comprise only one such marker button, or could comprise more than two marker buttons (with each marker button preferably having a different color) in alternative embodiments. It will be appreciated that the marker buttons can be differentiated from one another by means in addition to or in place of the color coding described herein. That is, physical characteristics such as shape of the buttons, size of the buttons or surface texture of the buttons could be used as the means of differentiating between different buttons. For example, in an alternative embodiment, marker button 207 is round and marker button 208 is square.

Each of marker buttons 207 and 208 are coupled to a tone generator which creates a distinct audio tone for each button pressed. The audio tone is recorded directly on one channel of the tape when the recording marker button is pressed. When a marker button is pressed, no sound is heard by the user. In a currently preferred embodiment, each of marker buttons 207 and 208 (as well as additional marker buttons in an embodiment with more than two marker buttons) place a tone on the tape having a different amplitude from the tone placed on the tape by any other marker button. Alternatively, other means to identify uniquely each marker button could be used. For example, each marker button could place a tone having a different frequency from any other marker button. As another example, each marker button could place a unique sequence of tones on the tape.

Recorder 200 is used to record virtually any type of audio data. For example, recorder 200 may be used to record dictation, reminder memos or the conversation among participants of a meeting. The audio data recorded by recorder 200 is recorded through microphone 201 and is recorded on a separate channel of the tape from the channel used to record the tone created by pressing marker button 207 or 208. When the audio data is played back, for example, by first pressing rewind button 205 and then play button 202, only the channel containing the material recorded through microphone 201, and not the tone generated by pressing a marker button, is played back. Thus, the operation of recorder marker buttons 207 and 208 does not affect the recording or playback of the audio data by recorder 200. In an alternative embodiment, the tone placed on the tape by a marker button can be placed on the same channel as that used for the audio data. In such an embodiment, all markers should utilize, for example, a sufficiently high frequency tone such that the marker will not be heard by the user. Of course, if it is desired for the tones placed by the marker buttons to be audible during playback, then the tones can be in an audible frequency range, and either placed on the same channel as the audio data, or on a separate channel, utilizing a recorder 200 which plays back both the audio data and marker channels.

As described above, when either of buttons 207 or 208 is pressed, a distinct audio tone is placed on a channel not used for recording of the audio data. A user can use marker buttons 207 and 208 to mark or stamp the recording at any desired point as the data is being recorded. The meanings attached to the markers could be assigned by the user. For example, marker button 207 could be used to indicate the beginning of dictated material which must later be typed. In this case, the user would momentarily depress button 207 as the user began each dictation, and the above-described audio tone would be placed on the tape at the point the dictation began. In a similar manner, marker button 208 could be used to mark, for example, reminder or "to do" items. That is, when a user records a reminder that something needs to be done at a future time, the user presses marker button 208 as the user begins recording the reminder.

The markers of the present invention can also be used to create a hierarchical scheme. For example, in an alternate embodiment, marker buttons in addition to 207 and 208 are used which have distinct tones and distinct colors from those used for any other marker button. For example, recorder 200 could have, in addition to red marker button 207 and green marker button 208, a blue marker button and a yellow marker button. In the hierarchical scheme, the blue marker button could be depressed whenever material relating to work will follow, and the yellow marker button could be depressed whenever personal material will follow. Thus, all material recorded between the time when the blue marker button is depressed and when the yellow marker button is depressed would be work related. Within this portion of the tape, marker button 207 and 208 could be used to indicate dictations and to do reminders, respectively, as before. Within portions of the tape following a marker placed by depressing the yellow button, the marker buttons 207 and 208 could have the same or a different meaning from those assigned for when they follow a marker placed by depressing a blue marker. Additionally, the hierarchical scheme described above can be implemented with the embodiment having two marker buttons 207 and 208 shown in FIG. 2. In this case, depressing one of marker buttons 207 or 208 twice in succession, or depressing marker button 207 followed immediately marker button 208, for example, could be used to indicate a specified tier in the hierarchy. As can be readily appreciated from the foregoing discussion, the present invention provides a flexible means for the user to determine the meaning and organization of the markers applied to the recorded audio data.

Recorder 200 also has, in a preferred embodiment, indicator light 210. Indicator light 210 is, in a currently preferred embodiment, a light emitting diode (LED). Indicator light 210 lights while any marker button is pressed. In this way, the user knows that he or she has made a mark on the tape when desired.

After the audio data, and any markers are recorded, the data and markers are transferred to computer system 100 of FIG. 1. First, the data is digitized (unless, of course, the data and markers are recorded in digital form) by well known methods. Next, a parser program prepares the data by locating any markers. In a currently preferred embodiment, the parser program searches the marker channel, filters out low level noise, and searches for "bursts" indicating the presence of a marker. By noting the amplitude level of the burst, the program identifies which marker was placed. The program also notes the location of the marker relative to the audio data. In alternative embodiments utilizing tones differentiated by means other than amplitude, the parser program notes the relevant characteristics (e.g., frequency), and differentiates between markers on that basis. Additionally, in a preferred embodiment, the parser program notes the location of any "breaks"—that is, portions of the tape where the recorder 200 was turned off and then on. After the audio data has been transferred and prepared, it can be displayed, played back and manipulated using the user interface of the present invention as will be described below, or stored in a file for later use.

After the data has been transferred and prepared as described above, the interface of the present invention is provided. It will be understood that while the user interface elements are described herein with reference to one or more specific embodiments, the appearance of the user interface elements can vary from the embodiments shown herein while still remaining within the spirit and scope of the present invention.

Figure 3:
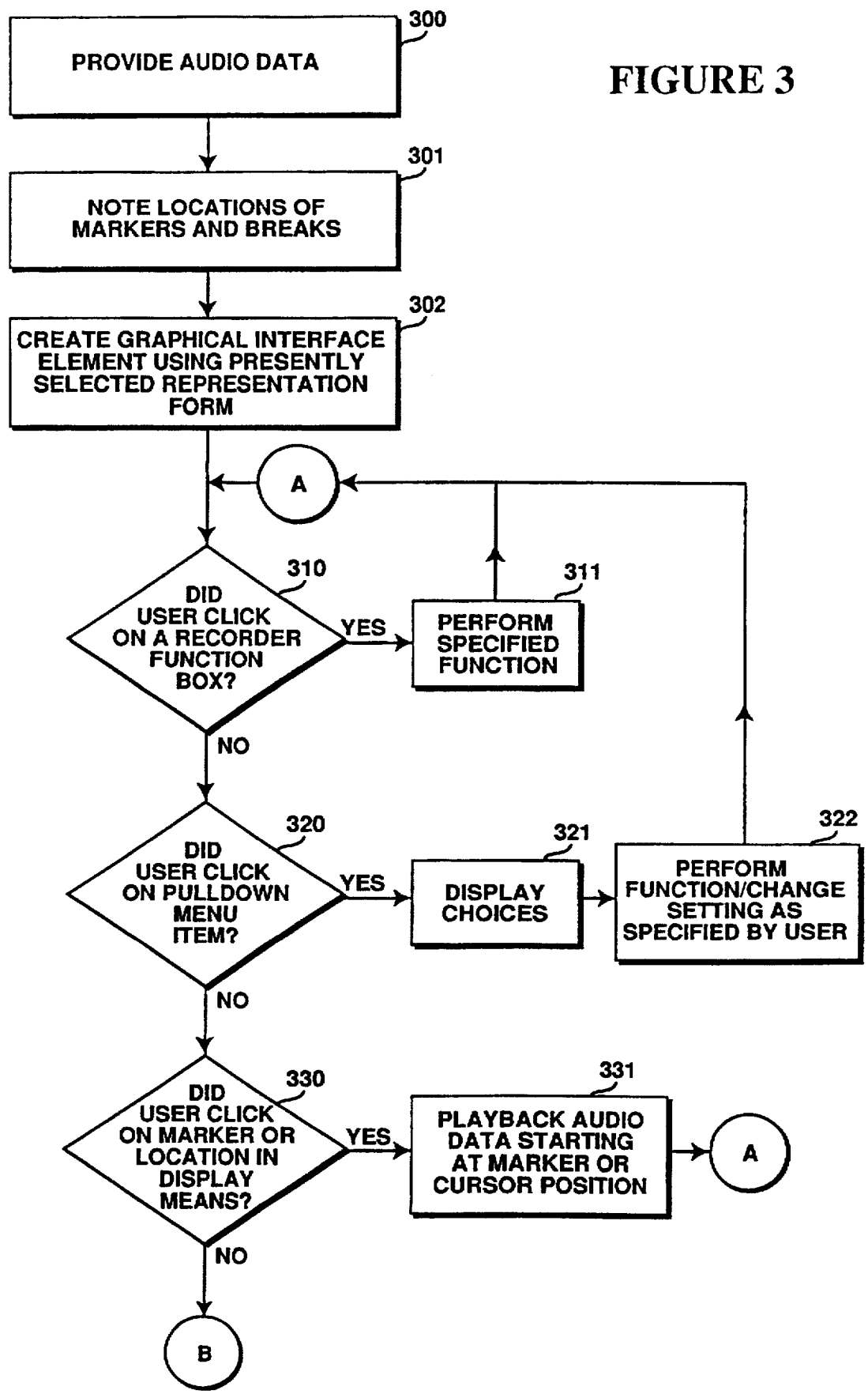
FIG. 3 shows a flowchart of a preferred embodiment of the user interface of the present invention.
Figure 3:
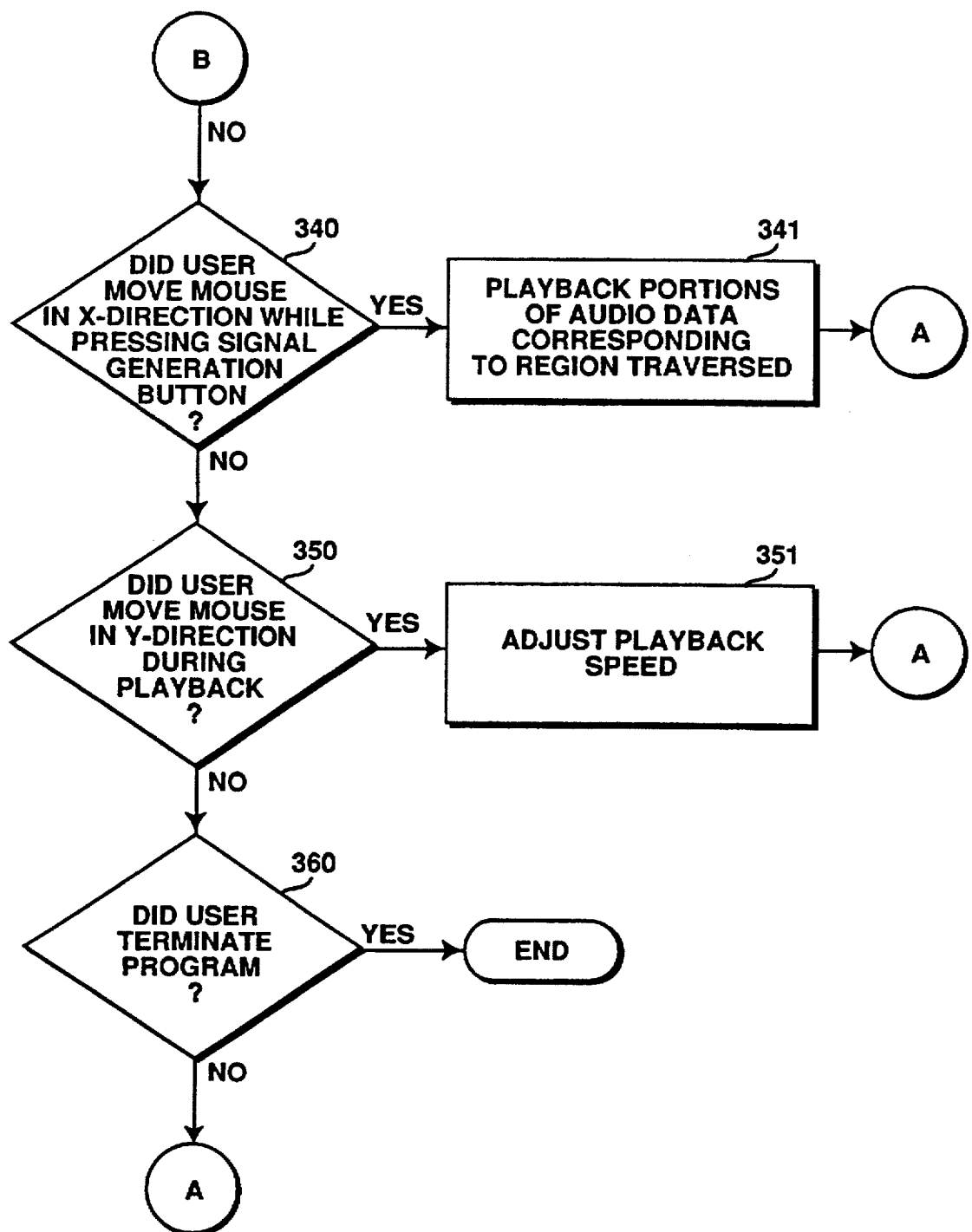

Referring to FIG. 3, the first step 300 is to provide the transferred and prepared audio data (as described above) to the computer system 100. Next, in step 301 the system notes the locations of the markers and breaks which occurred while the data was recorded, as described earlier. Next, in step 302, a graphical interface element having display means to display the data on display 121 is created. FIGS. 4-8 show several alternative display means used to display the audio data. When the data is initially displayed, computer system 100 will use the presently selected display means which will be either a default display means or the display means last selected.

Figure 4:
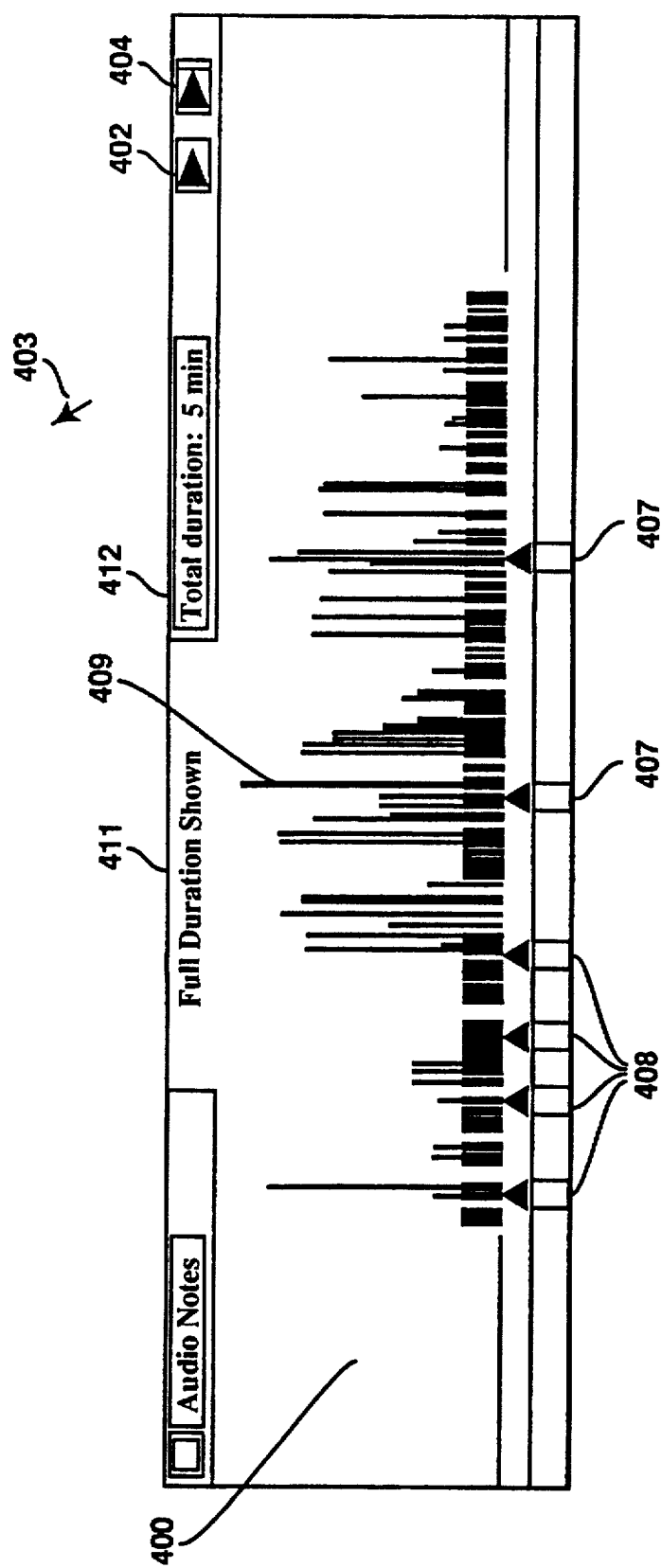
FIG. 4 shows a preferred embodiment of the interface display means for displaying audio data.

Referring now to FIG. 4, a portion of the user interface of the present invention is shown. In the embodiment shown in FIG. 4, display means 400 is a visual representation of the audio data which was previously recorded. Display means 400 is an amplitude bar graph which shows the positive magnitude of the amplitude of the recorded sound. The x-axis of the graph represents the time of the recording, and the y-axis represents the amplitude of the audio data. Thus, for example, the height of any bar in the graph represents the magnitude of the amplitude at the time corresponding to the bar's position along the x-axis. When the full duration of the audio data is represented, the beginning of the audio data (i.e., the material first recorded) is at the far left and the end of the audio data is at the far right. In the embodiment shown in FIG. 4, the sound data has been quantized. In the embodiment shown in FIG. 4, the data is quantized into, for example, 8 discreet values in order to exaggerate certain features of the audio. For example, subject breaks often appear as large gaps followed by large peaks. Also, portions of the audio data where no bars are present, indicating audio data within the zero level of quantization, can quickly be identified as, for example, periods of relative silence. In general, quantization eliminates the visual noise that is present in a full detail graphical representation, while allowing for distinctive audio data, for example, a loud noise such as a door slamming, to be quickly and easily identified.

Section 411 of the user interface element shown in FIG. 4 shows the fraction of the audio data which is being shown. In FIG. 4, as indicated, the full duration of the audio data is shown. Section 412 shows the total time of the recorded audio data. Below the graph are several visual markers. These markers correspond to locations in the audio data where marker buttons 207 and 208 were pressed as the audio data was recorded. Markers 407 correspond to recorder marker button 207, and markers 408 correspond to recorder marker button 208. As can be seen, there are four marker buttons 408 at the beginning of the data, indicating that marker button 208 was pressed four times near the beginning of the recording. Near the middle of the recording and about three-quarters of the way through the recording, two interface markers 407 are present. This indicates that marker button 207 was pressed at these points during the recording of the audio data. In a preferred embodiment, interface markers 407 and 408 are red and green, respectively, to correspond to marker buttons 207 and 208, respectively, on recorder 200, so that a user familiar with recorder 200 will intuitively understand the meaning of the interface markers. In the alternative embodiment discussed earlier, having additional marker buttons on recorder 200, additional interface marker are created having the same color as the corresponding marker buttons on recorder 200. Also, the interface markers such as 407 and 408 can include text instead of, or in addition to, color coding. For example, interface marker 408 could include, in the portion below the arrow, the phrase "to do", to indicate that marker button 208, which had been designated as the "to do" marker button, had been pressed. Any such text is preferably bordered in the color of the corresponding marker button or recorder 200. Additionally, in a currently preferred embodiment, orange markers (not shown in FIG. 4) similar to markers 407 and 408, are used to mark the above-mentioned breaks—i.e., portions of the audio data where the recorder was turned OFF and then ON. Thus, for example, if a series of lectures were recorded on one tape, the orange markers would indicate the starting position of each lecture in the series. Finally, if the alternative differentiating means between marker buttons on recorder 200 discussed earlier are used, than the interface markers correspond to the differentiating means used on the marker buttons on recorder 200. For example, if in an alternative embodiment the recorder marker button 207 is round and recorder marker button 208 is square, then the visual representation of interface marker 407 is round while that for interface marker 408 is square in the alternative embodiment. Similarly, in alternative embodiments employing recorder buttons differentiated by size, texture, or any other means, the visual representation of the interface markers is made to correspond as closely as possible to the physical differentiating characteristic.

Also shown in FIG. 4 is play indicator bar 409. As the audio data is being played back, indicator bar 409 moves to show the current position of the playback within the audio data. Also, as will be described below, are play button 402 and stop button 404. In an alternative embodiment, the user interface of the present invention additionally comprises fast forward and reverse buttons. Play button 402, stop button 404, as well as a fast forward button and reverse button, if present, contain the same symbols on the computer interface as on the recorder 200, so that a user familiar with recorder 200 will intuitively understand the function of these interface buttons. In addition, the spatial arrangement of the buttons on the interface can be the same as on recorder 200, to further increase the user's ability to go from the recorder to the computer interface without training. As will be obvious from the discussion below, the buttons 402, 404 as well as the additional buttons in an alternative embodiment are not necessary to the practice of the present invention as these functions can be performed in other manners.

In an alternative embodiment of the present invention, labels can be created by user speech. In this case, a label button is added to recorder 200. When the label button is depressed the user's speech is recorded on a channel separate from the rest of the audio data for so long as the label button was depressed. As with the previously described embodiment, the labels are noted when the data is transferred to computer system 100. In this embodiment, computer system 100 additionally comprises speech recognition capability in order to create interface markers for the spoken labels. Also, in this alternative embodiment, the user can initially create the interface markers by speaking the labels into sound recording/playback device 126 of computer system 100. After the label is spoken into computer system 100, the user selects visual representations for each spoken label. The user can select a color to represent each label, and/or text.

In the following steps 310 through 360 of FIG. 3, the function of the user interface in response to input from the user will be described. In a preferred embodiment, the user enters the input through mouse 123, equipped with the signal generation device 124 as described earlier. In the following discussion, the terminology of clicking on a menu item or dialog box will be used. As is well understood, this indicates that mouse 123 has been used to position the cursor 403 (shown as an arrow in FIG. 4) on the appropriate menu item or dialog box, and once cursor 403 has been positioned, the signal generation device 124 is momentarily depressed. Also, it will be understood that while the monitoring of user functions is described below in a specific sequence, the user interface of the present invention need not necessarily follow the specific sequence of steps described below, but may monitor the behavior of the user by any well known means.

Referring back to step 310 of FIG. 3, after the display of FIG. 4 has been created, the process looks to see if a user has clicked on a recorder function box, such as 402 or 404 of FIG. 4. If so, the specified function is performed. For example, if a user moves cursor 403 (via mouse 123) to box 402 and clicks the signal generation device 124, playback will be initiated at the beginning of the audio data. Likewise, if playback has been initiated and the user moves cursor 403 to box 404 and clicks signal generation device 124 while the cursor 403 is in that box, playback will stop. After the specified function has been performed, the process continues to look at the user's actions. Next, as indicated by step 320, the process looks to see if the user has clicked on a pull down menu item. When the user moves cursor 403 to a pull down menu item and continuously presses signal generation device 124, a list of selections is displayed. By moving the cursor 407 to the desired selection with signal generation device 124 depressed, and then releasing signal generation device 124 when the desired selection is highlighted, the user has chosen the highlighted selection. Then, as shown by step 322, the specified function is performed. For example, in a preferred embodiment, the user can pull down a menu allowing the zoom level of the display means 400 to be changed. Zooming will be discussed in relation to FIG. 5 below. In an alternate embodiment, the pull down menu is used to display a plurality of playback speed choices. By the method described above, the user can move cursor 403 to the menu bar, click on the speed item and select a playback speed setting. A further pull down menu function provided by the present invention is choice of the display means used to represent the audio data. The various choices will be discussed in relation to FIGS. 6A, 6B, and 7–9.

In addition to displaying a list of selections, a pull down menu item can bring up a dialog box. Once a dialog box is opened, the user can perform functions displayed therein. For example, in one embodiment, a slide bar is brought up for adjusting the zoom level. As the slide bar is moved up, the zoom level, i.e. magnification, increases. As the slide bar is brought down to the bottom, the zoom level is decreased such that the full duration is shown. In another embodiment, a similar slide bar is used to adjust the speed of playback. After the specified function has been performed or setting has been changed, the process continues to look at user actions. As an alternative or additional means for allowing users to perform the functions described above, special function icons can be used in addition to or in place of pull down menu items. For example, an icon which shows some visual representation of playback speed could, when clicked on, bring up a dialog box which allows the user to choose playback speed. Or, instead of bringing up a dialog box, a speed icon could be created which, when clicked on, incrementally increases playback speed, until the highest speed is reached. When the highest speed is reached, a click on the icon would cause playback speed to cycle back to the lowest speed, and so on.

Next, as shown by step 330 of FIG. 3, the process looks to see if the user has clicked on one of markers 407 or 408, or any location in display means 400. That is, the process look to see if the user has moved cursor 403 to some position within display means 400, or directly onto one of markers 407 and 408. If the user has moved the cursor 403 to such position and clicked on the signal generation device 124, playback will begin at the current position of cursor 403 within display means 400, or at the point in the audio data where the marker 407 or 408 which was clicked on is located, respectively. Playback will continue until stopped by the user or until the end of the audio data.

Next, as shown by step 340, the process looks to see if the user has moved the mouse in the x-direction while the cursor 403 is within display means 400 and while the signal generation device 124 is depressed. If so, portions of the audio in the regions traversed by the cursor are played. For example, if the user moves from a first position to a second position within display means 400 while depressing the signal generation device 124, small portions of the audio data will be sampled and played back as the user moves the mouse in the x-direction. The duration of the samples played will depend upon the speed in which the user moves the mouse. If the user moves the mouse quickly through display means 400 only small bits of audio data will be replayed, at relatively even intervals throughout the area traversed by the user. The user can move in either the positive or negative x-direction, while samples through the area traversed will be replayed as the cursor moves. This allows a user to quickly sample large portions of data, in order to find a portion of the audio data, where for example, no marker was placed, but where the user knows there is a relevant piece of audio data the user wishes to access. Once the user stops depressing signal generation device 124, playback will continue from the last position of cursor 403. As another means of quickly sampling large portions of the audio data, the user can move to any random point, as described above, and quickly play back portions of the audio data at increased playback speed, without pitch distortion, as described in the earlier-referenced patent application.

As shown by step 350, the process continues to monitor user actions. If the user moves the mouse in the y-direction while the audio data is being played back, then as shown by step 351, the playback speed is adjusted. In an alternate embodiment, the y-direction of the mouse is used to control the zoom level or magnification of the audio data within display means 400. As can be seen from FIG. 3, after the process has performed the functions specified by the user, as shown by steps 311, 321, 322, 331, 341 and 351, the process continues to monitor user actions. If the user terminates the program in step 360, for example by going to the pull down menu and selecting quit, the process is at an end.

It should be noted that several functions can be performed in a single mode. For example, in the preferred embodiment, the functions of steps 310 and 311, utilization of a recorder function box; and the functions of steps 330 and 331, playback initiated by clicking on a location in the display means or a marker; and the function of steps 340 and 341, sampling portions of the audio; and the function of steps 350 and 351, playback speed changes, can be performed in a single mode. That is, all these functions can be performed without engaging the interface into a separate mode while the user is utilizing the user interface of the present invention. This single mode operation allows for fluid and natural control and manipulation of the audio data. Other modes can be accessed to perform additional functions. For example, the pull down menus discussed in relation to steps 320–322 are used to access other modes.

Additionally, in a preferred embodiment, the present invention includes an edit mode, which is accessed via a pull down menu in steps 320–322. In this mode, the audio data can be rearranged or moved or deleted. When in the edit mode, cursor 403 can be moved to a portion of the audio data. With the signal generation device 124 depressed, portions of the audio data can be highlighted. Once highlighted, the highlighted portion can be moved to another location, cut entirely, duplicated, etc. In general, the audio data can be edited in many ways similar to familiar text or editing functions.

Additionally, another mode that can be accessed during steps 320–322, is a marker addition mode. In this mode, the user can pull down a menu allowing the user to add additional markers 407 and 408, to mark portions of the audio data that initially were mistakenly unmarked.

Figure 5:
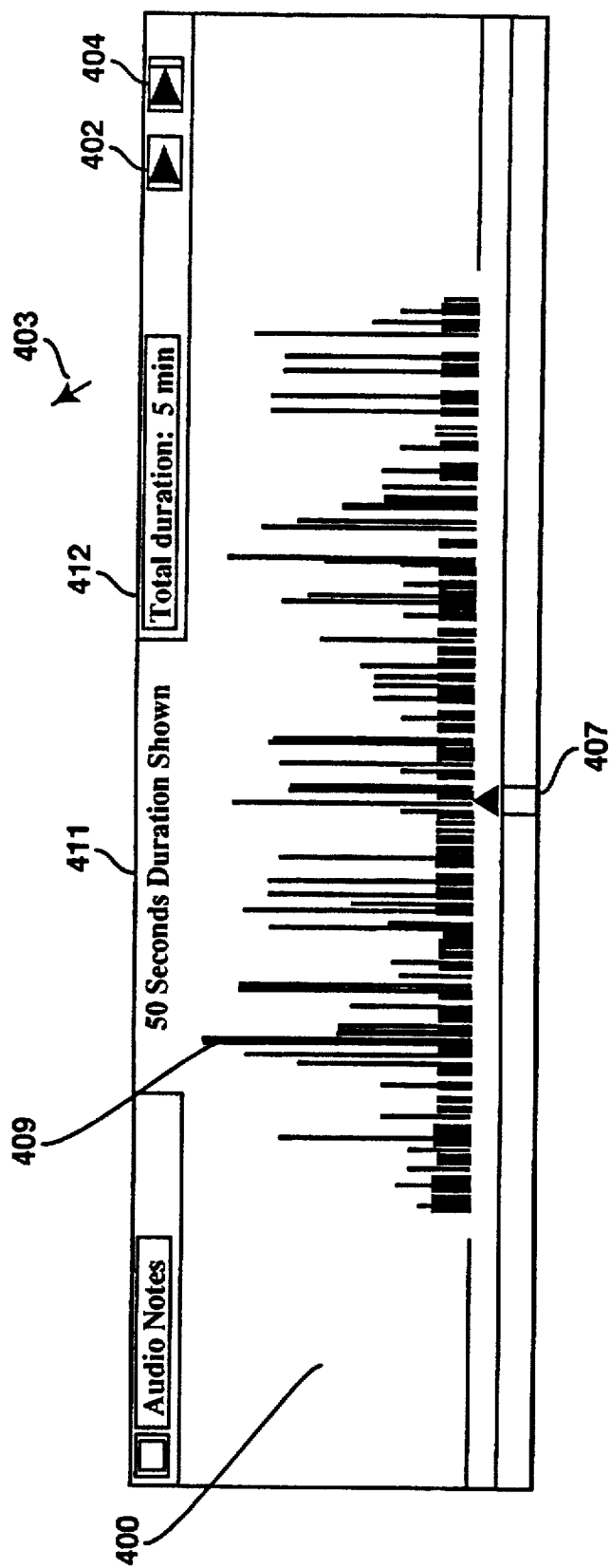
FIG. 5 is a magnified view of a portion of FIG. 4.

FIG. 5 shows a representation of a portion of FIG. 4, where the scale has been decreased, that is the magnification increased, to show greater detail. While zoomed in, the user can see less of the total audio data, but can see more detail in the portion shown. The zoom mode is useful for viewing portions of audio where the user is looking for a break, or other distinctive audio data, but where there was no marker. In general, a magnified portion of the audio data takes on a different appearance from the corresponding unmagnified portion, because many details not visible in the unmagnified views become visible only upon magnification (zooming in).

Figure 6A:
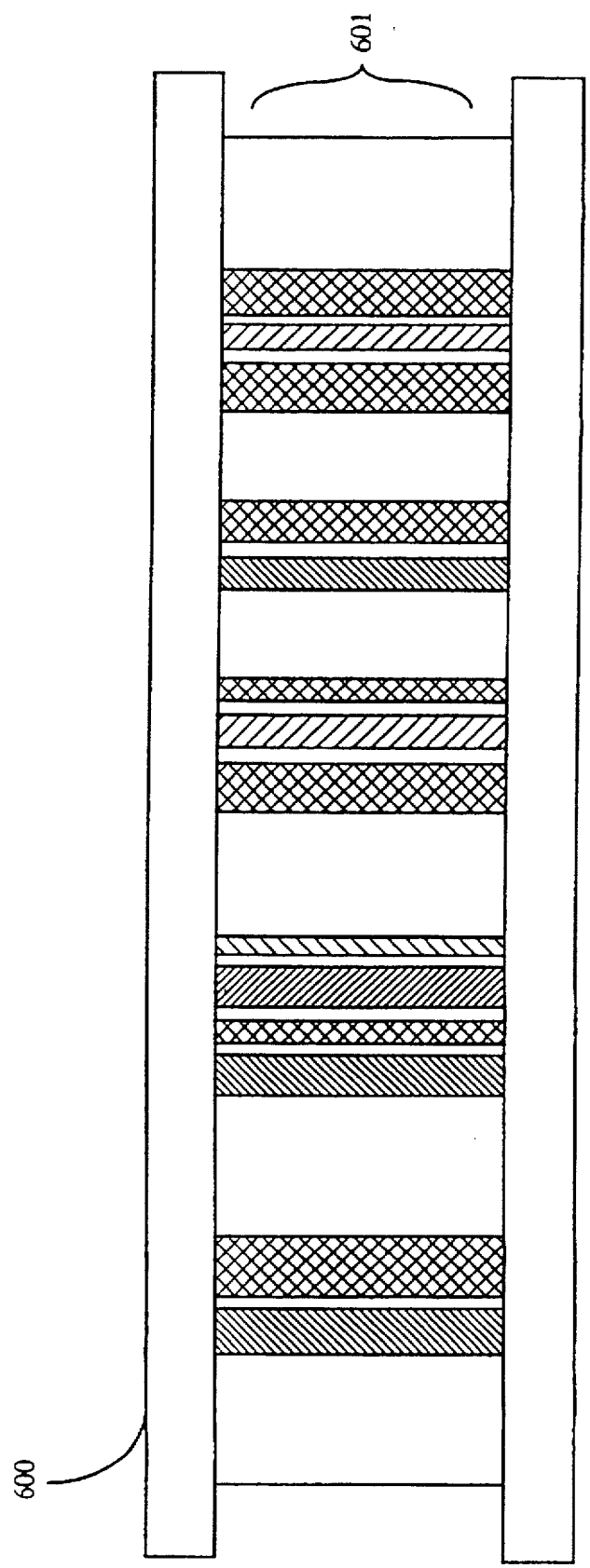
FIGS. 6–9 show alternate embodiments of display means for audio data in the user interface of the present invention.
Figure 6B:
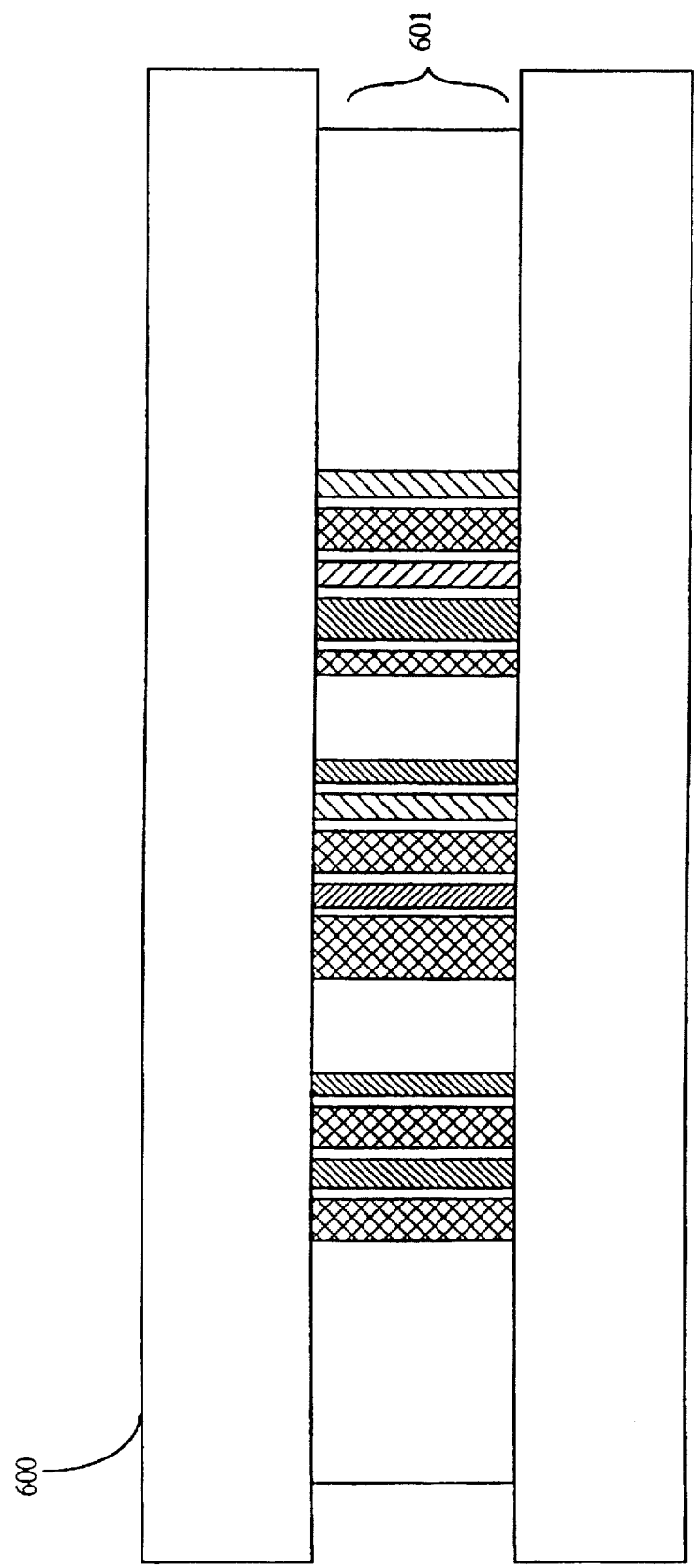

FIGS. 6A and 6B shows a color bar representation of the positive magnitude of the audio data. In FIGS. 6A and B, the amplitude of the audio data is, as with the embodiment shown in FIGS. 4 and 5, quantized. In the embodiment shown in FIGS. 6A and B, display means 600 consists of color bars. In this case, amplitude is mapped to color saturation. That is, the deeper colors represent high amplitude sound, whereas the light colors represent low amplitude sound. In places where the background and foreground colors are equal, subject or line breaks will most likely exist since this indicates that there is very little sound at these places. Note that in the bar graph representation of FIGS. 4 and 5, the zoom level can be determined only from reading portions 411 and 412 of the user interface element, which give the displayed portion of the audio data and the total duration, as described previously. In the preferred embodiment of the color bar representation of FIGS. 6A and B, zoom level is indicated by the width 601 of the display. That is, width 601 does not need to be used for amplitude as in the previous representation, since color saturation is mapped to amplitude. Therefore, the width 601 can vary as a zoom level varies. For example, when the user is looking at a low magnification or high scale version, for example viewing all the audio data, width 601 is at its widest as shown in FIG. 6A. When the user has increased the magnification, width 601 decreases, as shown in FIG. 6B. Thus, the embodiment shown in FIGS. 6A and B allows for a convenient visual means of displaying the current zoom level.

Figure 7:
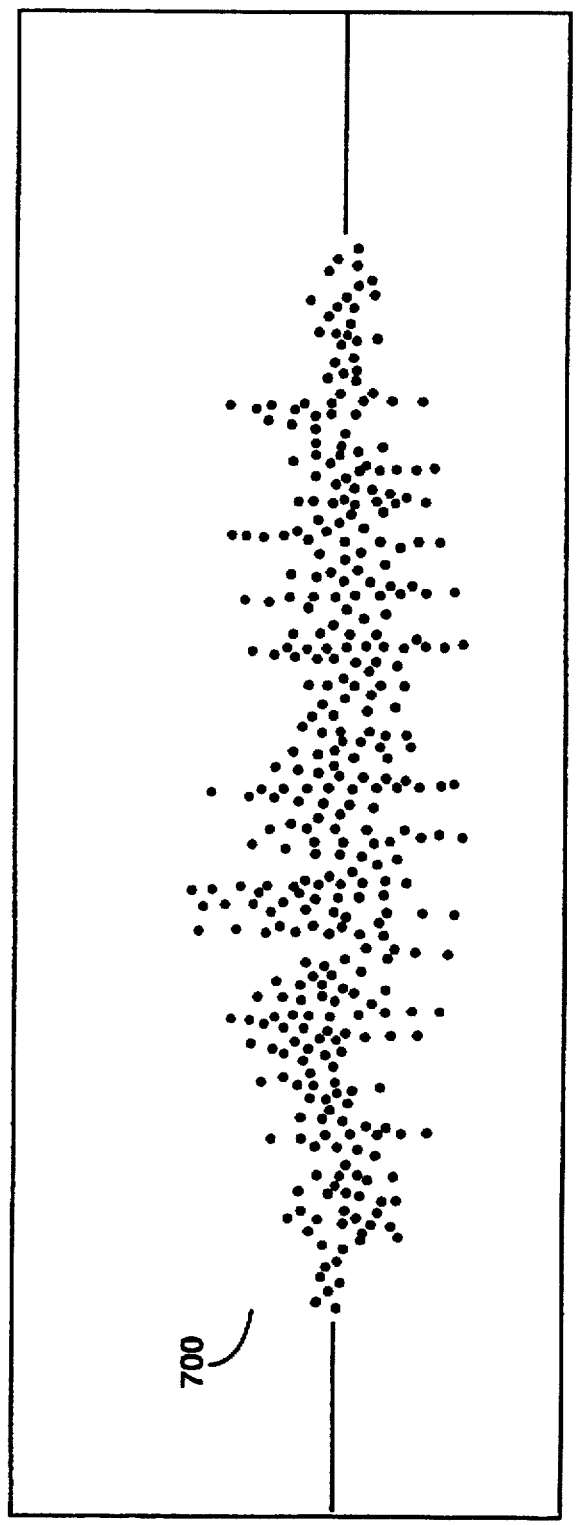
Figure 8:
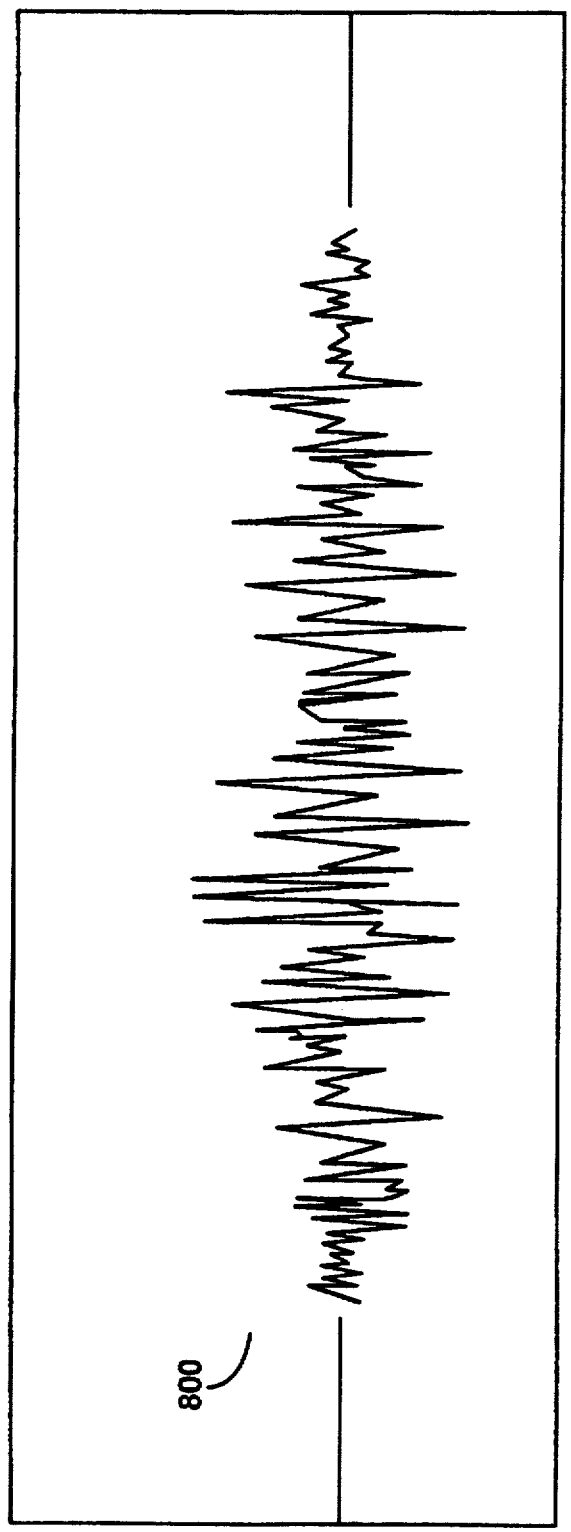
Figure 9:
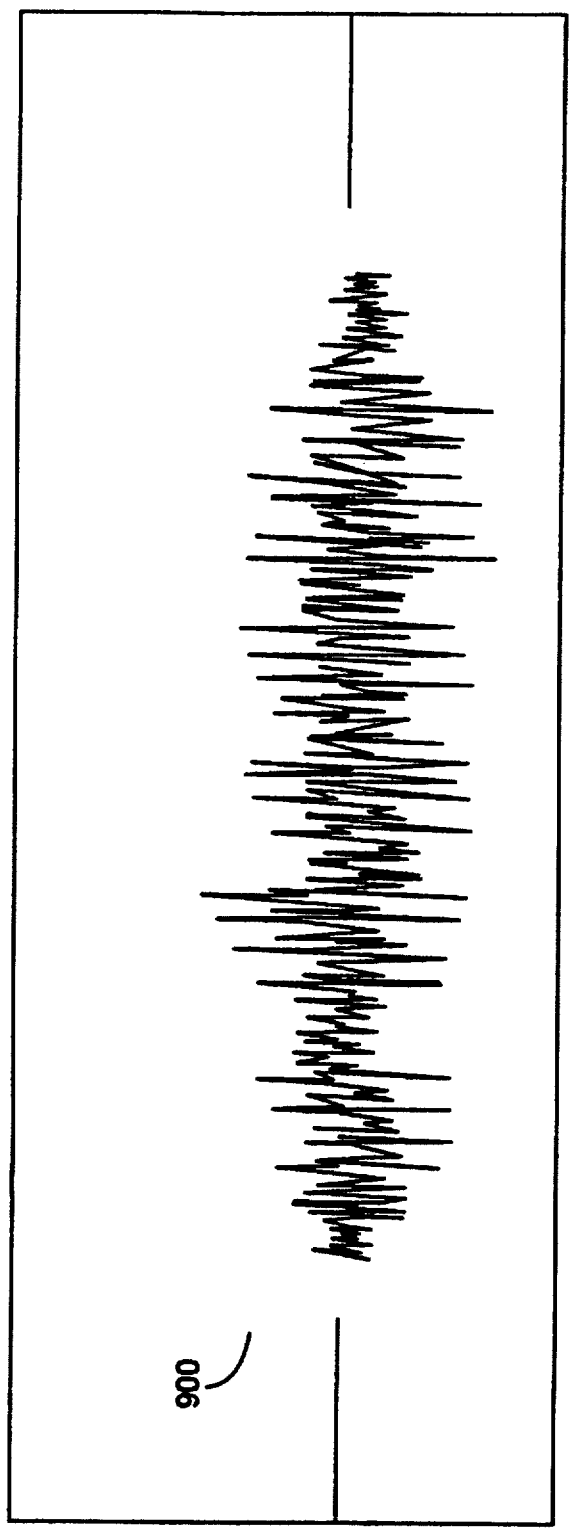

FIGS. 7–9 show several alternative display means which may be used in place of display means 400 of FIGS. 4 and 5 or display means 600 of FIGS. 6A and B. It will be understood that many display means not shown in the embodiments described herein could be utilized which are within the scope of the present invention. In FIGS. 7–9, only the display means portion of the user interface, and not the interface markers or function boxes are shown. However, it will be understood that all the above described features and elements are present in any display means within the scope of the present invention. FIG. 7 shows a dot amplitude representation of the audio data. In FIG. 7, each dot of display means 700 represents one bit of the audio data. Each dot shows the quantized amplitude of the sound recording at the corresponding time on the x-axis. FIG. 8 shows a line amplitude representation. Display means 800 of FIG. 8 is essentially the dot representation of FIG. 7, with sequential dots connected. Finally, FIG. 9 shows a solid body amplitude representation. Display means 900 of FIG. 9 is essentially the line amplitude representation of FIG. 8, with the space between adjacent lines filled in. Display means 900 provides a way to view audio data and quickly differentiate between silent portions and portions with relatively dense audio data. Note that display means 700, 800 and 900, in contrast to display means 400 and 600, show both positive and negative amplitude displacement.

It will be appreciated that some of the above-described functions of the user interface implemented on computer system 100 can also be implemented on recorder 200. For example, recorder 200 can comprise a search function which searches for an occurrence of a specified marker. Additionally, recorder 200 could also comprise a small touch screen, allowing for display and manipulation of the audio data as described above. In essence, recorder 200 and computer system 100 could be integrated into a single unit. Of course, such an integrated unit may not have some of the advantages of separate components. For example, as more functionality is integrated into recorder 200, the size of the recorder 200 will increase.

Thus, a method and apparatus for marking audio data, with the meaning and organization of the markers determined by the user, has been disclosed. A computer interface for audio data has also been disclosed. In the present invention, the user can view a visual representation of the audio data, playback the audio data at any random point or a marked point, stop playback and change the speed of the audio data in a single mode. Several other functions, such as zooming and various editing functions, are also disclosed.

We claim:

1. An audio data user interface for use in a computerized system having a processor, a memory and a display device comprising:

a visual representation of said audio data displayed on said display device by said processor, said memory storing information corresponding to said visual representation, wherein said visual representation is displayed along a first axis and a second axis, wherein a width of one of said first and said second axis varies as a magnification of said audio data shown by said visual representation varies.

2. The audio data user interface as described in claim 1 wherein said visual representation comprises a representation of an amplitude of said audio data, said visual representation comprising a color bar representation.

3. The audio data user interface as described in claim 2 wherein said amplitude is mapped to color saturation.

4. The audio data user interface as described in claim 3 wherein the other of said first and said second axis represents time.

5. The audio data user interface as described in claim 2 wherein the other of said first and said second axis represents time.

6. The audio data user interface as described in claim 1 wherein the other of said first and said second axis represents time.

* * * * *